United States Patent
Mandal et al.

(10) Patent No.: US 11,625,451 B2
(45) Date of Patent: Apr. 11, 2023

(54) LOCAL SEARCH WITH GLOBAL VIEW FOR LARGE SCALE COMBINATORIAL OPTIMIZATION

(71) Applicant: FUJITSU LIMITED, Kawasaki (JP)

(72) Inventors: Avradip Mandal, San Jose, CA (US); Arnab Roy, Santa Clara, CA (US); Sarvagya Upadhyay, San Jose, CA (US); Hayato Ushijima-Mwesigwa, San Jose, CA (US); Xiaoyuan Liu, Pendleton, SC (US)

(73) Assignee: FUJITSU LIMITED, Kawasaki (JP)

( * ) Notice: Subject to any disclaimer, the term of this patent is extended or adjusted under 35 U.S.C. 154(b) by 273 days.

(21) Appl. No.: 16/888,445

(22) Filed: May 29, 2020

(65) Prior Publication Data

US 2021/0064687 A1   Mar. 4, 2021

Related U.S. Application Data

(60) Provisional application No. 62/894,579, filed on Aug. 30, 2019.

(51) Int. Cl.
*G06F 17/11* (2006.01)
*G06Q 10/04* (2012.01)
*G06N 20/00* (2019.01)

(52) U.S. Cl.
CPC .............. *G06F 17/11* (2013.01); *G06Q 10/04* (2013.01); *G06N 20/00* (2019.01)

(58) Field of Classification Search
CPC ......... G06F 17/11; G06Q 10/04; G06N 20/00

USPC ........................................................ 708/446
See application file for complete search history.

(56) References Cited

U.S. PATENT DOCUMENTS 5,450,535 A * 9/1995 North .................... G06T 11/206
345/440

OTHER PUBLICATIONS

"Clustering-driven evolutionary algorithms: an application of path relinking to the quadratic unconstrained binary optimization problem" Published by Journal of Heuristics (Year: 2019).*
AAarts, Emile, Emile HL Aarts and Jan Karel Lenstra, eds. "Local search in combinatorial optimization". Princeton University Press, 2003.
(Continued)

*Primary Examiner* — Zeina Elchanti
(74) *Attorney, Agent, or Firm* — Maschoff Brennan

(57) ABSTRACT

A method of solving a large scale combinatorial optimization problem including inputting, via at least one processor, an objective function and an initial solution as a mapping from a plurality of n nodes, randomly clustering the plurality of nodes into k clusters of n/k nodes each, for each cluster of the k clusters, assigning binary variables to denote each possible permutation of a label set within the cluster, determining that there are $u=k^2$ variables if $k>2$, and $u=1$ variables if $k=2$, expressing the objective function in terms of the un/k variables, solving the objective function in terms of the un/k variables using a Quadratic Unconstrained Binary Optimization (QUBO) solver to obtain an updated solution, determining whether a convergence criteria is satisfied for the updated solution, and upon a determination that a convergence criteria is satisfied, outputting the updated solution to the objective function.

17 Claims, 14 Drawing Sheets

(56) References Cited

OTHER PUBLICATIONS

Shaydulin Ruslan, et al. "Network community detection on small quantum computers." Advanced Quantum Technologies (2019): 190029.
Saydulin, R., Ushijima-Mwesigwa, H., Safro, I., Mniszewski, S., & Alexeev, Y. (2018). "Community detection across emerging quantum architectures". arXiv preprint arXiv: 1810.07765.
EP Search Report in Application No. 20186647.2 dated Jan. 12, 2021.
Dunning et al., "What Works Best When? A Systematic Evaluation of Heuristics for Max-Cut and QUBO" Operation Research Center, Massachusetts Institute of Technology, Oct. 2018.
Glover et al., "QUBO Models in Optimization, Machine Learning, and Quantum Computing" ECCO XXXII Conference May 2019.
Liu et al., "On Modeling Local Search with Special-Purpose Combinatorial Optimization Hardware" Jan. 27, 2020.

* cited by examiner

LOCAL SEARCH WITH GLOBAL VIEW FOR LARGE SCALE COMBINATORIAL OPTIMIZATION

CROSS-REFERENCE TO RELATED APPLICATIONS

This application claims priority to U.S. Provisional Application No. 62/894,579, filed Aug. 30, 2019, entitled "LOCAL SEARCH WITH GLOBAL VIEW FOR LARGE SCALE COMBINATORIAL OPTIMIZATION," which is herein incorporated by reference in its entirety.

FIELD

The embodiments discussed in the present disclosure are related to methods for solving large scale combinatorial optimization problems using efficient Quadratic Unconstrained Binary Optimization (QUBO) solvers.

BACKGROUND

A local search algorithm is a popular heuristic method which is used for solving large scale combinatorial optimization problems. Local search algorithms move from a solution to a solution in the space of candidate solutions by applying local changes, until a solution which is deemed optimal is found or a time limit is exceeded.

With a limited scope of the given problem, a standard local search algorithm returns a new solution by making a small change in the current solution and evaluating whether or not the given change should be performed. The process is iteratively repeated until a convergence criteria is reached. Typically, a new solution is accepted if it improves the objective value, otherwise the new solution is rejected. In some instances, the process can be extended to accept a worse solution via an acceptance criteria.

Local search algorithms are widely applied to numerous hard computational problems, including a variety of applications in computer science, mathematics, operations research, and engineering. Examples of well-known local search algorithms are WalkSAT for SAT and k0opt for the Traveling Salesman Problem.

Generally, local search algorithms which are typically used in the literature over a small window size because larger window sizes require exponentially increased computational size. As may be understood, this requirement that the size of the window be limited results in a smaller solution space than may be desired.

In an attempt to perform a local search over larger window sizes, "quantum local search" (QLS) methods have been proposed. QLS is a hybrid classical-quantum approach which combines a classical computer with a small quantum device to solve problems which are significantly larger than the device. One benefit of QLS methods is that they are hardware-agnostic and easily extendable to new quantum computing.

It has been demonstrated that the 2-community detection problem can be solved on graphs of sizes of up to 410 vertices using the 16-qubit IBM quantum computer and D-Wave 2000Q and the performance of these solutions is compared with the optimal solutions.

One proposed method for performing quantum local search includes using larger window sizes, but each is analyzed one at a time, which results in greater computational hardware requirements as there are difficulties applying constraints and finding a feasible solution that satisfies the constraints. In some embodiments, such methods may be executed on quantum-inspired hardware accelerated QUBO solvers.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include inputting, via at least one processor, an objective function and an initial solution of the large scale combinatorial optimization problem as a mapping from a plurality of n nodes to 2 clusters. The method may also include randomly clustering, via the at least one processor, the plurality of nodes into k clusters of n/k nodes each. The method may also include for each cluster of the k clusters, assigning binary variables to denote each possible permutation of a label set within the cluster. The method may also include determining, via the at least one processor that there are $u=k^2$ variables if $k>2$, and $u=1$ variables if $k=2$. The method may also include expressing the objective function in terms of the un/k variables. The method may also include solving the objective function in terms of the un/k variables using a Quadratic Unconstrained Binary Optimization (QUBO) solver to obtain an updated solution to the initial solution. The method may also include determining whether a convergence criteria is satisfied for the updated solution. The method may also include, upon a determination that a convergence criteria is satisfied, outputting the updated solution to the objective function.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3A depicts a hardware size of 1024, whereas FIG. 3B illustrates a hardware size of 8000;

FIG. 4A illustrates the density of feasible solutions per degrees of freedom for a hardware size of 1024, whereas FIG. 4B illustrates the density of feasible solutions per degrees of freedom for a hardware size of 8000;

FIG. 5A illustrates the number of simultaneous local searches performed per degrees of freedom for a hardware of size 1024, whereas FIG. 5B illustrates the number of simultaneous local searches performed per degrees of freedom for a hardware of size 8000;

DESCRIPTION OF EMBODIMENTS

Figure 1:
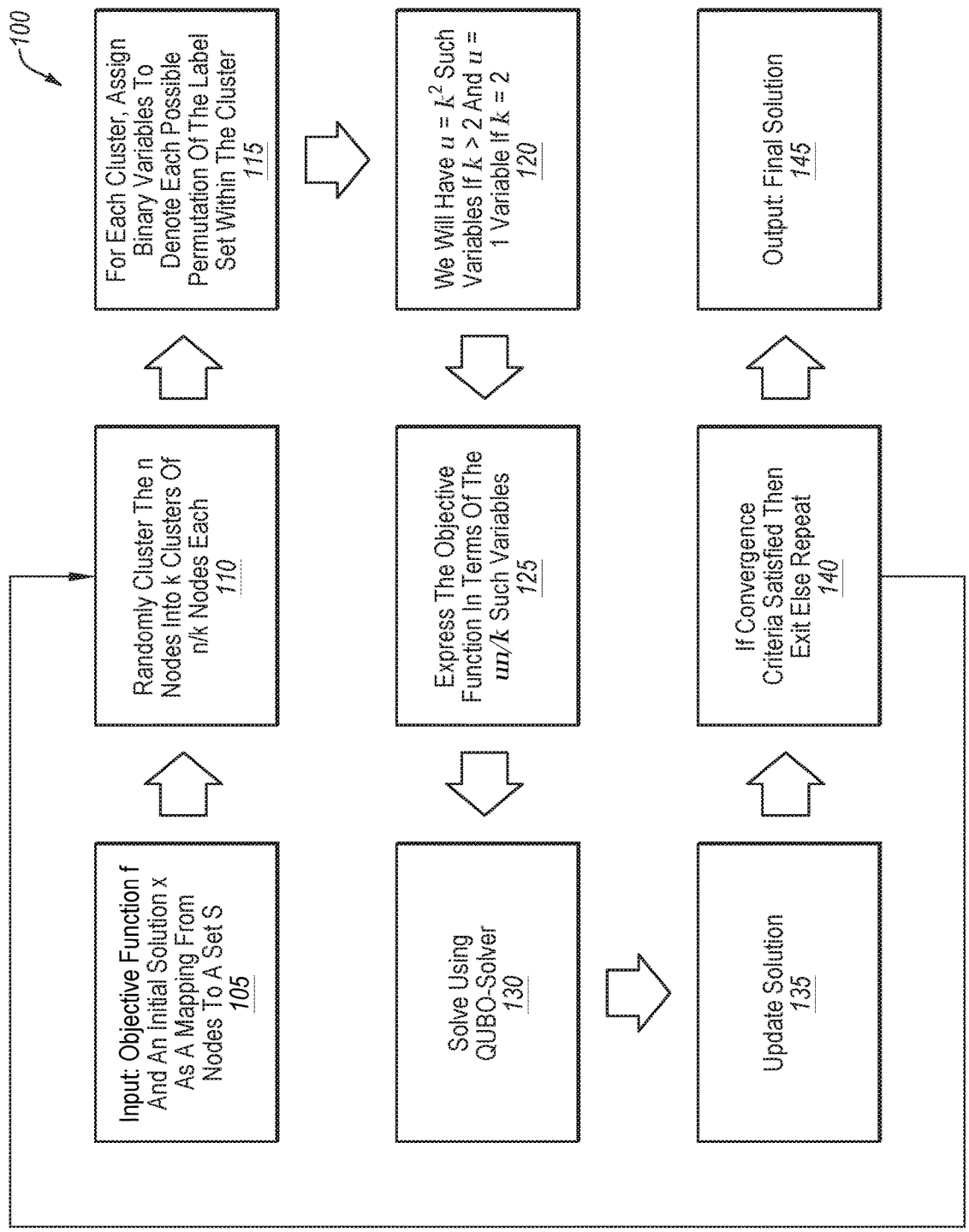
FIG. 1 depicts an example flow diagram of a method for using a QUBO solver in a large scale combinatorial optimization problem.

The embodiments discussed in the present disclosure are related to methods for solving large scale combinatorial optimization problems using efficient Quadratic Unconstrained Binary Optimization (QUBO) solvers. More specifically, embodiments described herein are directed to a proposed quantum local search with a global view that is capable of iterating multiple windows at once. Using this method, it is possible to find a feasible solution that satisfies constraints easier and with less computational demands than the QUBO solver computational resources that are currently known in the art. As may be understood, this enables one to search an exponentially larger solution space while using the same amount of quantum hardware that is used in a smaller solution space. Further, embodiments herein also provide adjustable parameters that control how much QUBO solver resources which are used for finding feasible solutions. In some instances, this may enable an exploration of a deeper search space.

A QUBO problem is a binary optimization problem where any term in the objective function is either linear or quadratic:

$$\Sigma_{\{i,j\} \in [n] \times [n]} A_{ij} x_i x_j + \Sigma_{i=1}^{n} b_i x_i,$$

where $A_{ij}$'s are real constants and the goal of the optimization is to minimize over $x_i$'s, where either $x_i \in \{0,1\}^n$, when viewed in Boolean space or $x_i \in \{-1, +1\}^n$, when viewed in Ising space, for all $i \in \{1, 2, \ldots, n\}$.

Currently, several difficult combinatorial optimization problems are modeled by QUBO problems. For example, https://www.sumofsquares.org/public/lec02-1_maxcut.html discusses three NP-hard optimization problems which can be phrased by optimizing a quadratic polynomial. One specific method described on the website includes the ability to formulate a maxcut, or for any graph, a bipartition of the vertex set that cuts as many edges as possible as a polynomial optimization problem.

QUBO is a versatile modeling tool and problems in several disciplines can be summarized using QUBO. For example, QUBO has been used for modeling problems in the areas of quantum physics, quantum chemistry, graph theory, machine learning, and combinatorial/discrete optimization. As the existences of more approximation strategies increases along with the discovery of better heuristic techniques and application of numerical linear algebra techniques opens an additional range of options for applying QUBO methods. Further, tractable optimization techniques over larger domain and rounding to a binary solution can lead to a close to optimal solution.

An additional advantage of using QUBO is that it provides a simplistic modeling tool. QUBO is a simple abstraction methodology wherein all one needs to specify a QUBO is a matrix and a vector. As may be understood, this assists in developing various heuristic methods to solve a variety of problems.

Further, QUBO is a powerful modeling tool. Constrained binary optimization problems can be converted into QUBO1 problems. Generality is with respect to degree, and as such, over binary variables, degree reduction techniques exist to convert higher order binary optimization to QUBO.

A variety of QUBO solvers are currently known in the art, including the D-Wave 2000Q, Google® OR-Tools, Gurobi Optimization, Gekko Dynamic Optimization, IBM Cplex, and the Fujitsu Digital Annealing Unit.

In some instances, a QUBO may have constraints added to the objective function in order to favor some desired states while penalizing other states. More specifically, a QUBO with constraints may be defined as a Quadratic Binary Objective Function and a series of constraints. In such instances, if the density of feasible solutions that satisfy the constraints is low, then finding a feasible solution is hard. If the density of feasible solutions that satisfy the constraints is high, then finding a feasible solution is easy. As is described more fully below, one benefit of the methods and system described herein is that the density of the feasible solutions can be controlled, and as such it is easier to find a feasible solution and it is possible to more effectively use QUBO solvers.

FIG. 1 is a flowchart of an example method 100 that efficiently uses QUBO solvers in large scale combinatorial optimization problems, according to at least one embodiment described in the present disclosure. The method 100 may be performed by any suitable system, apparatus, or device. For example, as is described more fully below, one or more operations of the method 100 may be performed by one or more elements of the computing system 202 of FIG. 2 or multiples of the computing system 202 of FIG. 2. Although illustrated with discrete blocks, the steps and operations associated with one or more of the blocks of the method 100 may be divided into additional blocks, combined into fewer blocks, or eliminated, depending on the particular implementation.

The method 100 may begin at block 105, where an objective function (f) and an initial solution x are input into the system as a mapping from nodes to a set S. At block 110, the n nodes of the set S are randomly clustered into k clusters of n/k nodes each. These k clusters are also referred to herein as k elements within windows. At block 115, for each cluster, binary variables are assigned to denote each possible permutation of a label set within the cluster.

At block 120, it is determined that there are $u=k^2$ variables if k>2, and u=1 variables if k=2. At block 125, the objective function (f) is expressed in terms of the un/k variables. At block 130, the objective function (f) expressed in terms of the un/k variables is solved using a QUBO-solver. At block 135, the solution is updated. At block 140, a determination is made as to whether the convergence criteria are satisfied. If the convergence criteria are satisfied at block 140, then a final solution is output at block 145. If the convergence criteria are not satisfied at block 130, then the method returns to block 110 and a new random cluster of the n nodes into k clusters of n/k clusters each is performed.

Modifications, additions, or omissions may be made to the method 200 without departing from the scope of the present disclosure. For example, the operations of method 200 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

As may be seen in the table below, as compared with previously used Quantum Local Searches, for windows of size k, where k is smaller, the methods described herein, referred to as "Local Global Search," provide a exponentially large space as compared to the search space provided by Quantum Local Search methods which are currently known. More specifically, for k=2, using Local Global Search, the search density of feasible solutions is 1. As k increases, the density of feasible solutions decreases. For maximum possible k=$\sqrt{H}$+1, the density is smallest and the results of the Local Global Search become the same as are available under the Quantum Local Search. In the chart, the solver of size H denotes the number of variables a solver can handle. "TSP" corresponds to the Traveling Salesmen Problem, "LOP" corresponds to the Linear Ordering Problem, "QAP" corresponds to the Quadratic Assignment Problem, and "LA" corresponds to the Linear Assignment Problem.

combinatorics, or others in order to analyze the data as a QUBO problem in order to find a solution. As such, the computing system 202 may consist of a single, stand-alone computing device, such as the device described more fully below with respect to FIG. 2, or may exist as a component or sub-module of another computing device configured to receive, sense, or otherwise create input data to be analyzed as a QUBO problem.

Figure 2:
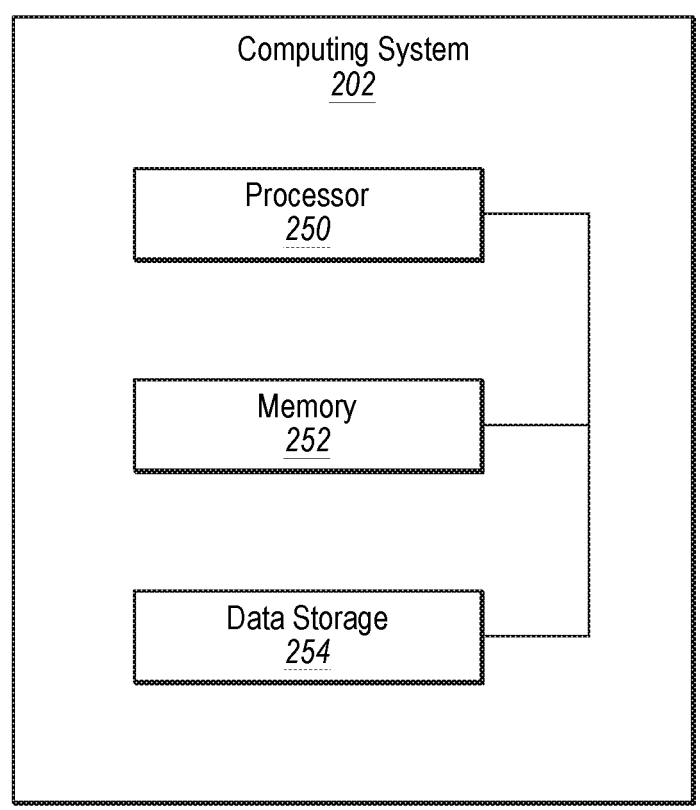
FIG. 2 is a diagram representing an example computing system configured to use a QUBO solver to solve a large scale combinatorial optimization problem.

As such, modifications, additions, or omissions may be made to FIG. 2 without departing from the scope of the present disclosure. For example, the computing system 202 may include more or fewer elements than those illustrated and described in the present disclosure.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the proces-

| QUBO Problem Type | Quantum Local Search Feasible Search Space in one iteration | Density | Local Global Search $\frac{H}{(k-1)^2}$ windows of size $k$ Search Space in one iteration | Density |
|---|---|---|---|---|
| TSP, LOP, QAP, LA | $(\sqrt{H}+1)!$ | $(\sqrt{H}+1)!$ | $(\sqrt{H}+1)!$ | $\frac{(k!)^{\frac{H}{(k-1)^2}}}{2^H}$ |

FIG. 2 illustrates a block diagram of an example computing system 202 that may be configured to assist in using QUBO solvers in large scale combinatorial optimization problems to perform the Local Search with a Global Search, according to at least one embodiment of the present disclosure. The computing system 202 may be configured to implement or direct one or more operations associated with a conversion module and/or an execution environment. The computing system 202 may include a processor 250, a memory 252, and a data storage 254. The processor 250, the memory 252, and the data storage 254 may be communicatively coupled.

As may be readily understood, although the computing system 202 is shown as a single system, it should be understood that it may be used in an environment in association with other systems configured specifically for solving QUBO problems in a variety of different applications. As such, the computing system 202 may be used in association or as a part of a machine learning environment or other computing environment specifically designed to receive data representing the various fields of, for example, physics, computer science, quantum chemistry, quantum physics, sors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

The memory 252 and the data storage 254 may include computer-readable storage media for carrying or having computer-executable instructions or data structures stored thereon. Such computer-readable storage media may include any available non-transitory media that may be accessed by a general-purpose or special-purpose computer, such as the processor 350. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuuten, 500 F.3d 1346 (Fed. Cir. 2007). Combinations of the above may also be included within the scope of computer-readable media.

Combinations of the above may also be included within the scope of computer-readable storage media. Computer-executable instructions may include, for example, instructions and data configured to cause the processor 450 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

Figure 3B:
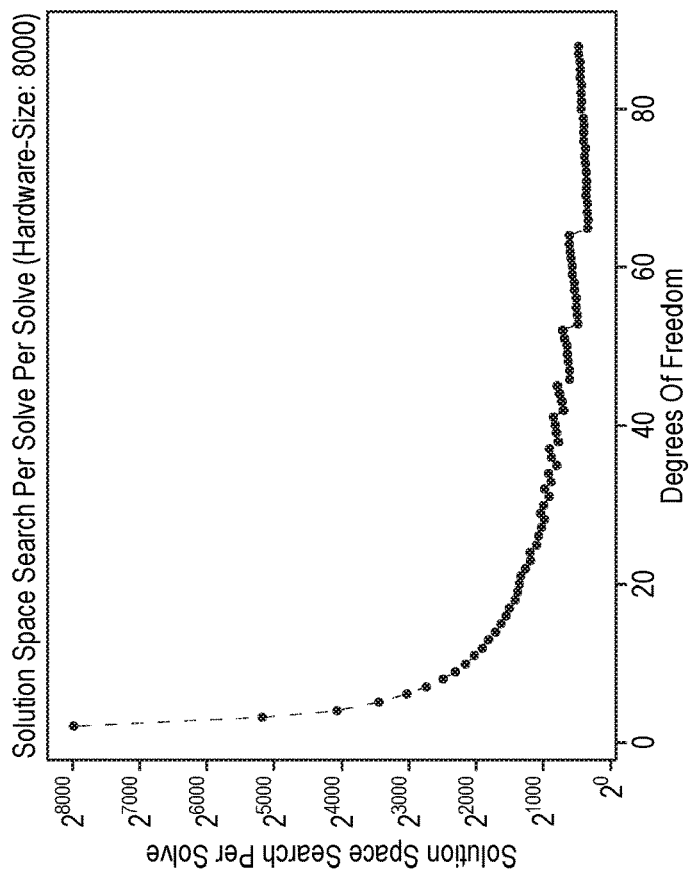
FIGS. 3A and 3B comprise two graphs which illustrate the solution space which may be searched for different sized hardware, where
Figure 3A:
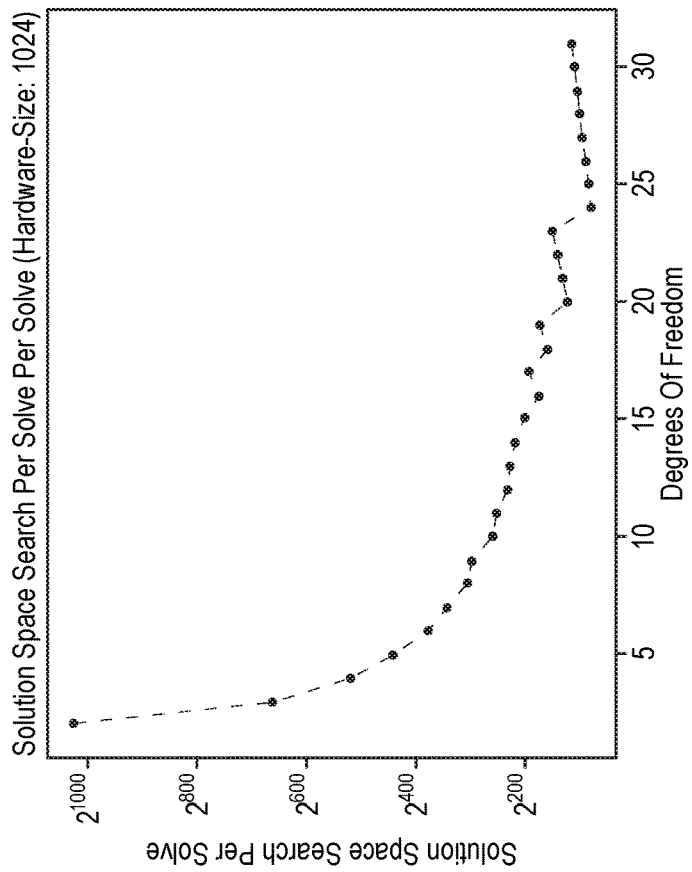

FIGS. 3A and 3B illustrate the solution space which may be searched per solution for different sized hardware. For example, FIG. 3A illustrates the solution space per solution and degrees of freedom for a hardware of size 1024, whereas FIG. 3B illustrates the solution space per solution and degrees of freedom for a hardware of size 8000.

As may be understood, the degrees of freedom represented by the x-axis in FIGS. 3A and 3B represent the number of possible values a node can be assigned to at the next iteration. For example, in the Traveling Salesperson Problem (TSP), the degrees of freedom represents the number of positions in the tour a node can be assigned to. Generally, the larger the number of degrees of freedom, the better the search.

In FIGS. 3A and 3B, the y-axis is represented by the solution space search, or the number of feasible solutions explored at each iteration. Generally, the larger the number of solution space search, the better the search.

Figure 4B:
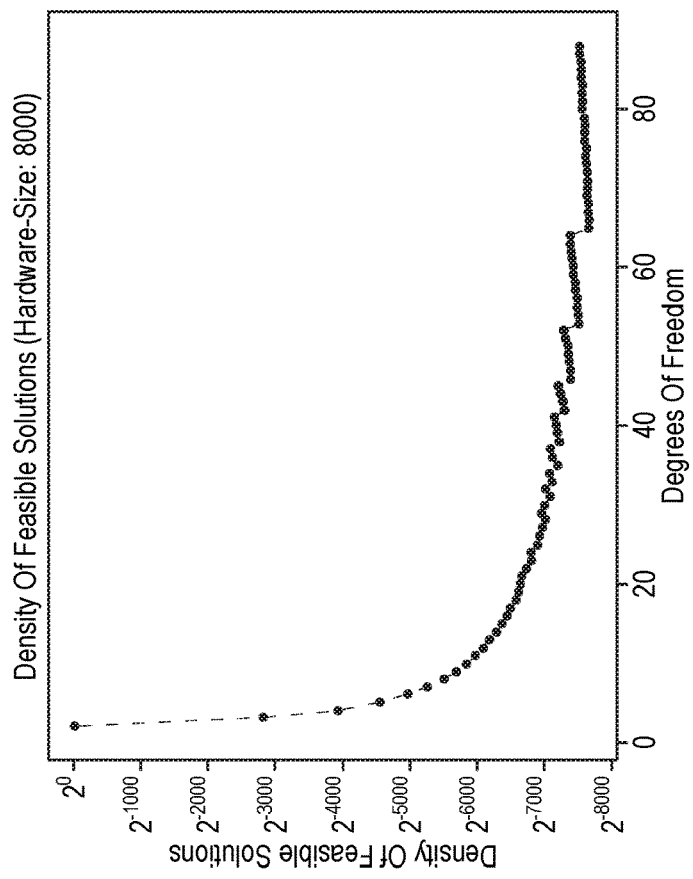
FIGS. 4A and 4B comprise two graphs which illustrate the density of feasible solutions versus the degrees of freedom for different sized hardware, where
Figure 4A:
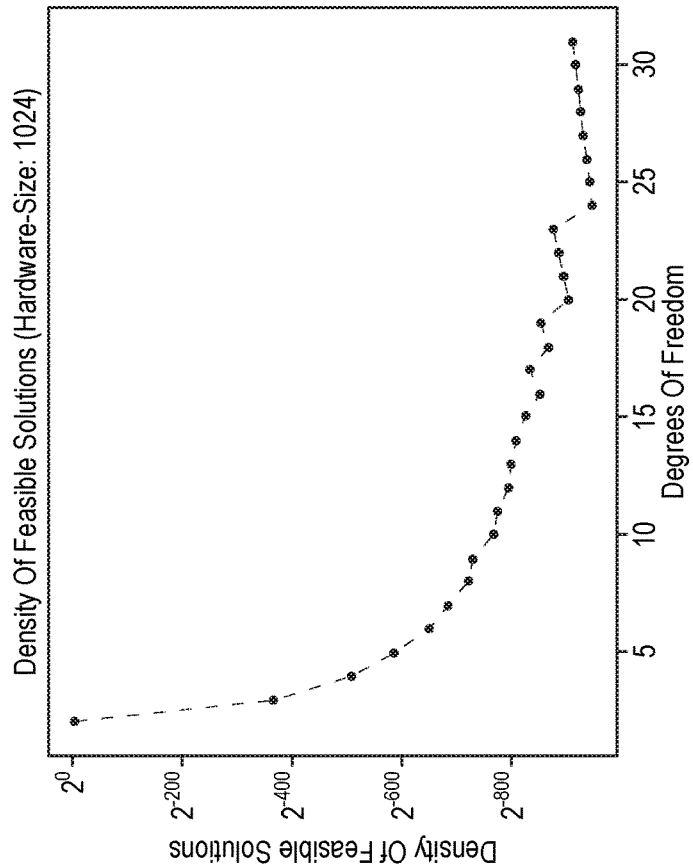

FIGS. 4A and 4B illustrate the density of feasible solutions versus the degrees of freedom for different sized hardware. For example, FIG. 4A illustrates the density of feasible solutions per degrees of freedom for a hardware of size 1024, whereas FIG. 4B illustrates the density of feasible solutions per degrees of freedom for a hardware of size 8000.

In the QUBO model, not all solutions to the QUBO are necessarily feasible solutions to the original problem. As such, the density of $$\text{feasibilty} = \frac{\text{number\_feasible\_solutions}}{2^{\text{hardware\_size}}}.$$

In general, the larger the density of feasibility, the better utilized a component of hardware is considered to be.

Figure 5B:
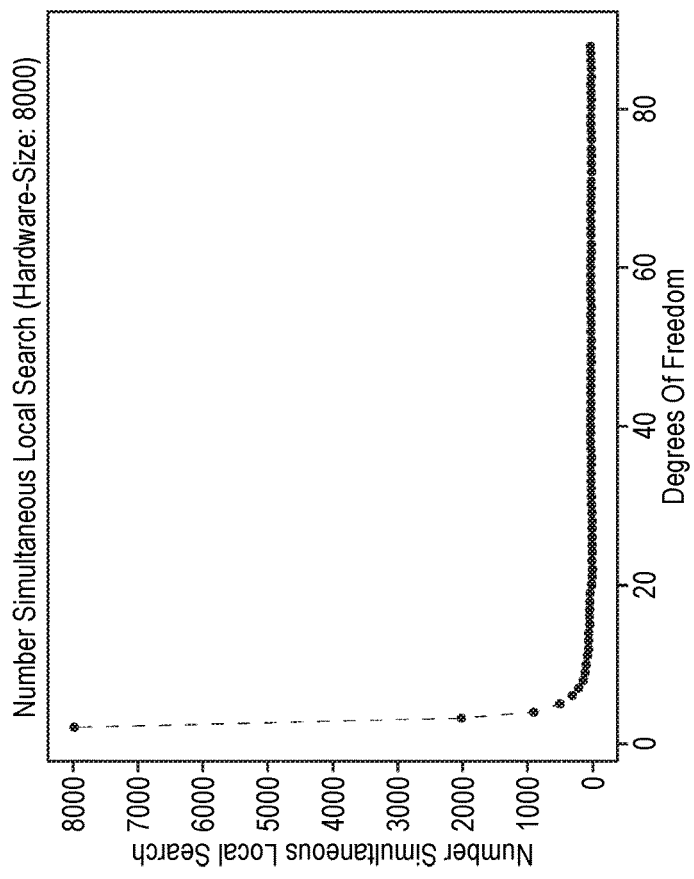
FIGS. 5A and 5B illustrate the number of simultaneous local searches performed versus the degrees of freedom for different sized hardware, where
Figure 5A:
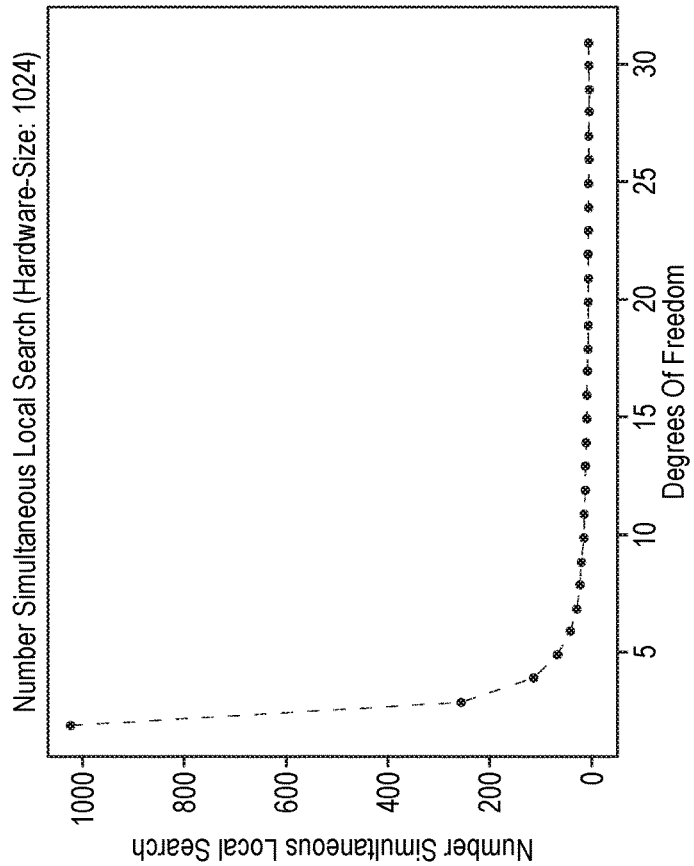

FIGS. 5A and 5B illustrate the number of simultaneous local searches performed versus the degrees of freedom for different sized hardware. For example, FIG. 5A illustrates the number of simultaneous local searches performed per degrees of freedom for a hardware of size 1024, whereas FIG. 5B illustrates the number of simultaneous local searches performed per degrees of freedom for a hardware of size 8000.

Generally, performing a Parallel Local Search requires that if more than one local search is performed at the same iteration, these sub-problems must be mutually independent. As may be understood, one benefit of the Local Global Search described herein is that it does not such a requirement, making it a more powerful search and provides a larger number of simultaneous local searches. Generally, this provides a better and more efficient search.

The Local Global Search method described herein with respect to FIG. 1 may be extended to a variety of large-scale combinatorial optimization problems, including the Travelling Salesman Problem, the Quadratic Assignment Problem, the Linear Ordering Problem, the Linear Arrangement Problem, the K-way community detection problem, the K-way graph partitioning problem, along with others. Such optimization problems naturally occur in a variety of different real-world optimization problems, including job scheduling in an organization, vehicle routing for delivering cargo, learning causality from observed data, unsupervised learning of social network data, deciding ranking from 2-way comparison data, and a variety of different other areas.

Quadratic Assignment Problem (QAP)

Herein, the application and advantages of the Local Global Search of and method recited in FIG. 1 will be described with respect to the Quadratic Assignment Problem, although it should be noted as described above that the systems and methods described herein may be extended to a variety of large-scale combinatorial optimization problems beyond the Quadratic Assignment Problem and that the extended description hereof is included as only one example of the applicability of the system and methods described herein.

Figure 6:
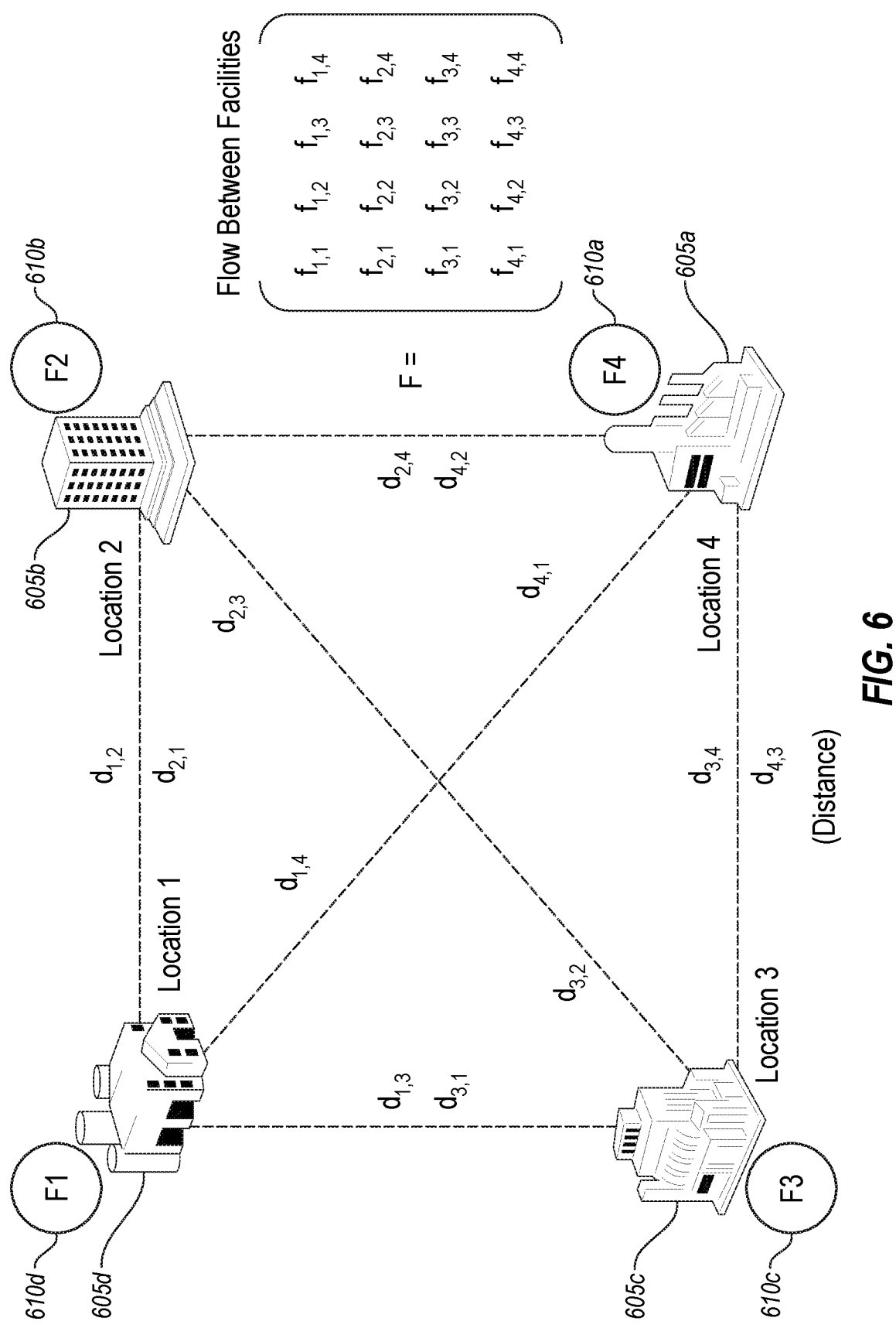
FIG. 6 is a diagram which illustrates a traditional QAP problem.

FIG. 6 illustrates a traditional QAP problem as illustrated in "Tournament selection based antlion optimization algorithm for solving quadratic assignment problem," by Kiliç, Haydar, and Uğur Yügeç, published in *Engineering Science and Technology, an International Journal* 22.2 (2019): 673-691. In FIG. 6 there is a set of n facilities 610a-d at n different locations 605a-d. Although n=4 in the example shown in FIG. 6, it should be understood that the QAP problem is applicable for a plurality of different values for n. For each pair of locations 605a-d, a distance d is specified, and for each pair of facilities 610a-d, a weight or flow is specified. In some instances, the weight corresponds to supplies to be transported between the two facilities. As may be understood, the purpose of the QAP problem is to assign all the facilities to different locations so as to optimize the sum of the distances multiplied by the corresponding flows.

As a real world application, such a solution would provide the most efficient way of distributing facilities among the various locations so as to reduce the amount of distance that supplies would need to be transported between the various facilities.

Figure 7:
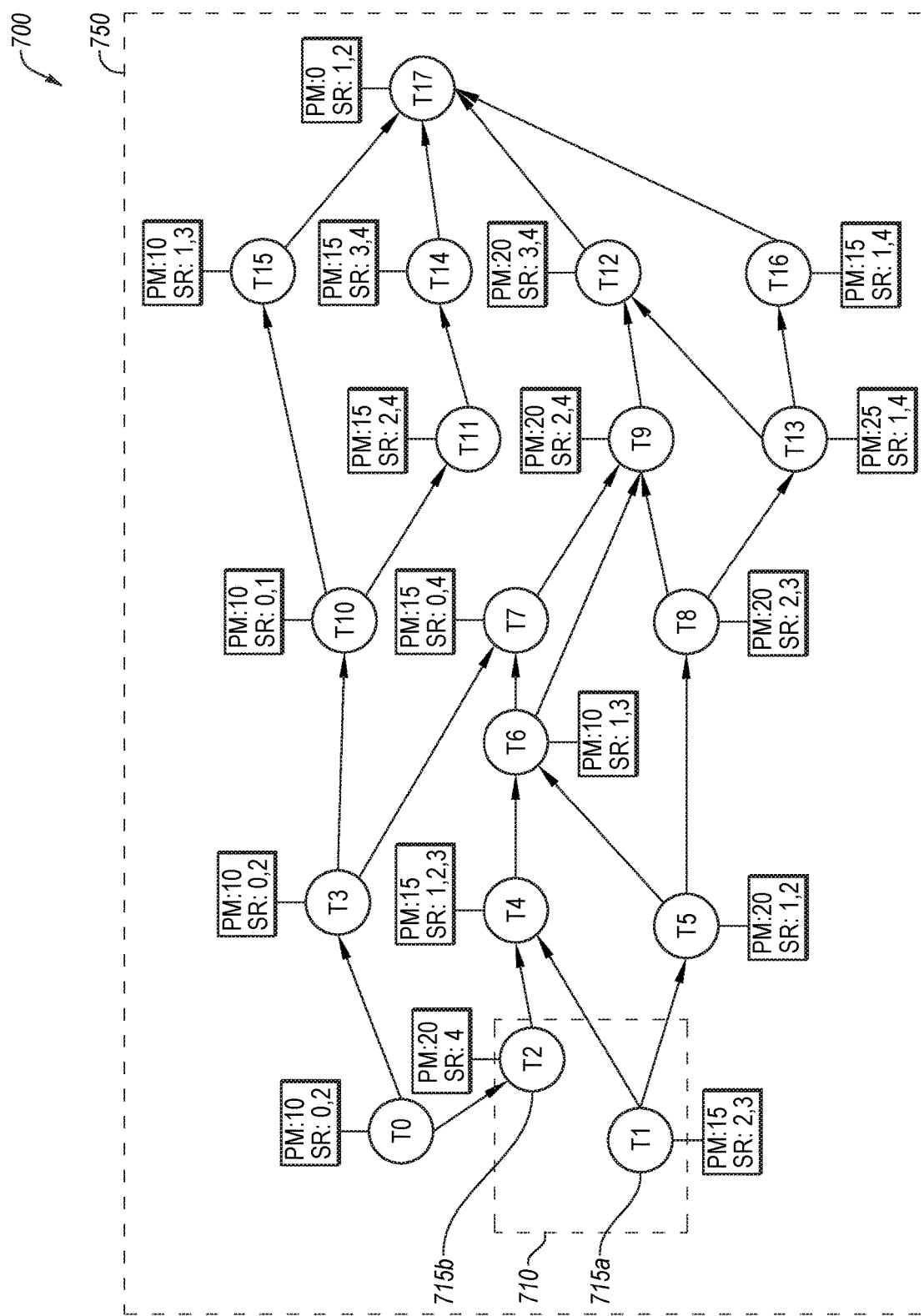
FIG. 7 is a diagram which illustrates a QAP problem in a given space using a series of nodes.

FIGS. 7-10 utilize a diagram illustrated in "Genetic algorithms for project management," by Chang, Carl K., Mark J. Christensen, and Tao Zhang, published in Annals of Software Engineering 11.1 (2001): 107-139. FIG. 7 is a diagram 700 which represents a QAP problem in a given space 750. Using traditional Local Search methods for solving the given QAP problem, a heuristic method is used to solve the optimization problem by identifying a solution in a sub-space 710 of the given space 750. The Local Search operates by moving from solution to solution in the sub-space 710 of candidate solutions by applying local changes until a solution deemed optimal is found or a time limit is exceeded.

For example, the table below illustrates an initial solution and updated solution for the QAP problem according to a Local Search. As is shown below the updated solution is applied to the sub-space 710 of the locations 1 and 2. In this instance, k=2, corresponding to the two locations 715a and 715b.

| Initial Solution | | Updated Solution | |
|---|---|---|---|
| Flow | Location | Flow | Location |
| 1 | 1 | 1 | 2 |
| 2 | 2 | 2 | 1 |
| 3 | 3 | 3 | 3 |
| 4 | 4 | 4 | 4 |
| 5 | 5 | 5 | 5 |
| 6 | 6 | 6 | 6 |

Figure 8:
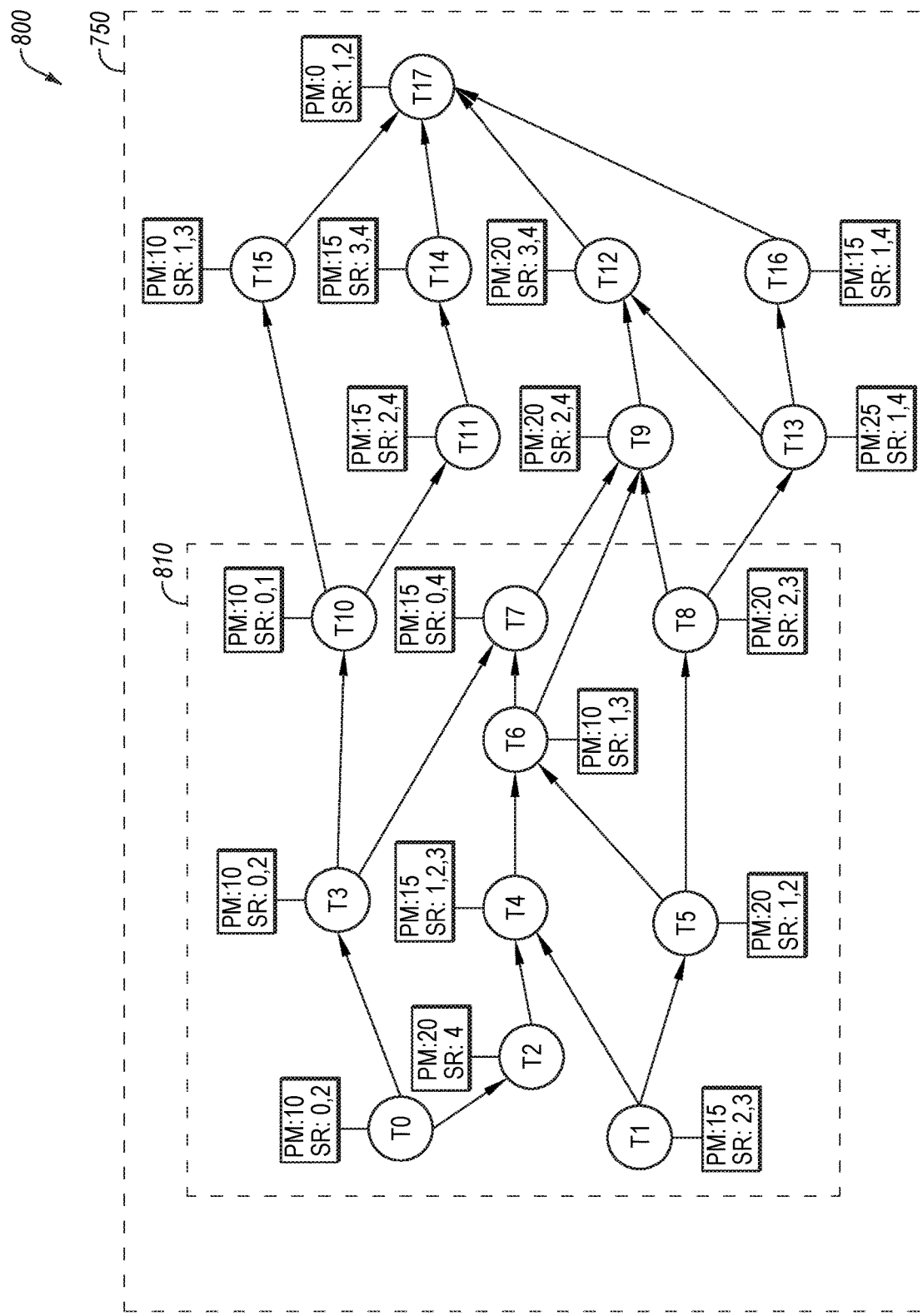
FIG. 8 is a diagram which illustrates a QAP problem illustrated as a series of nodes in a given space which is solved using a Quantum Local Search algorithm.

In contrast to the Local search described with respect to FIG. 7, FIG. 8 illustrates a Quantum Local Search (QLS) which may be used to solve the QAP problem. A QLS is a hybrid-classical quantum approach that combines a classical computer with a small quantum device to solve problems significantly larger than the device. More particularly, as is shown in FIG. 8, a greater sub-set 810 of the space 750 is analyzed to find and updated solution. The table shown below illustrates an example of an initial and updated solution which may be provided using a QLS approach which can be compared to the results of the Local Search:

| Initial Solution | | Updated Solution | |
|---|---|---|---|
| Flow | Location | Flow | Location |
| 1 | 1 | 1 | 2 |
| 2 | 2 | 2 | 1 |
| 3 | 3 | 3 | 4 |
| 4 | 4 | 4 | 5 |
| 5 | 5 | 5 | 3 |
| 6 | 6 | 6 | 6 |

Figure 9:
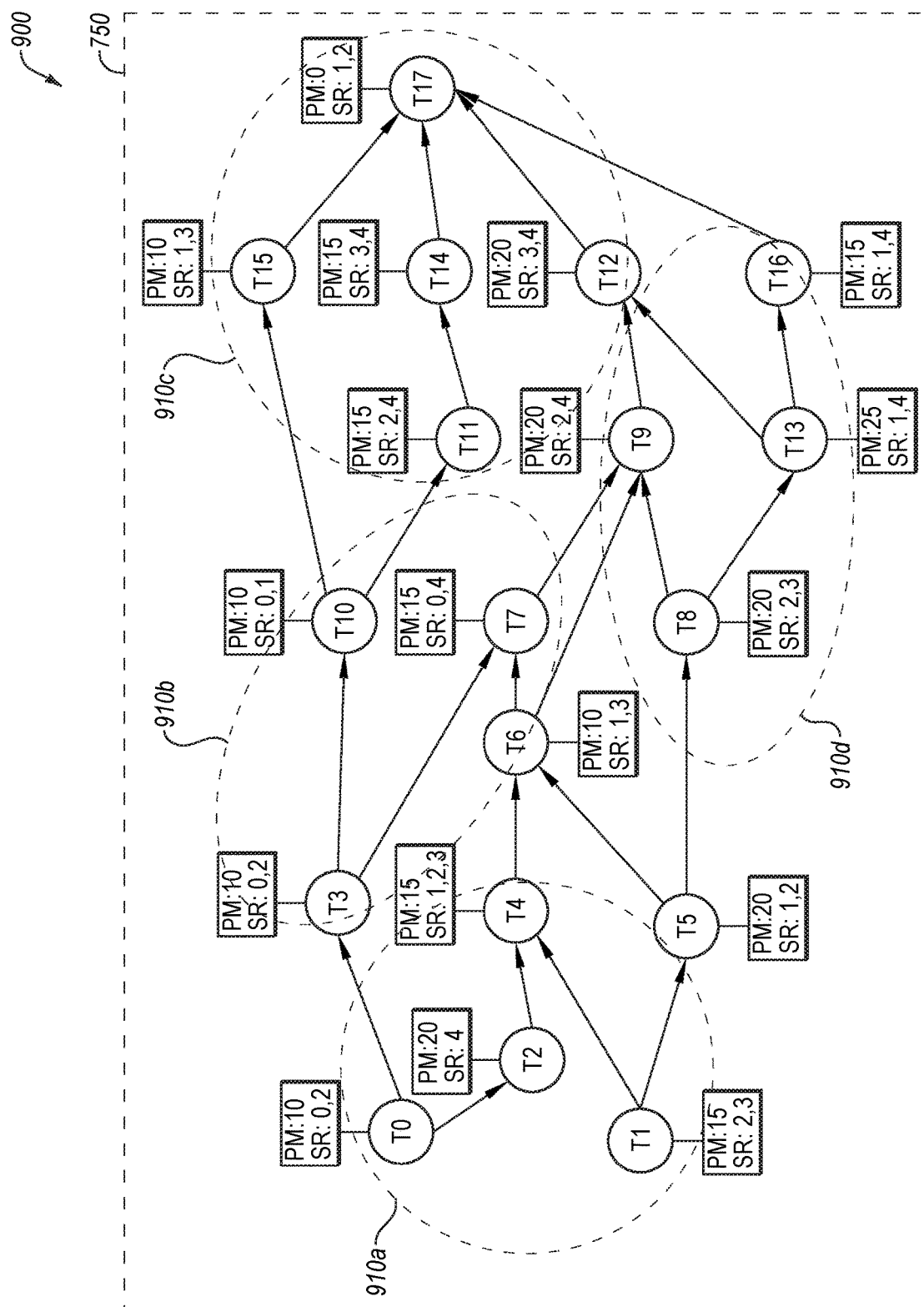
FIG. 9 is a diagram which illustrates a QAP problem illustrated as a series of nodes in a given space which is solved using a Local Global Search algorithm.

FIG. 9 illustrates the methods which may be used and results which may be acquired by using the Local Global Search described herein as applied to the QAP problem. In some instances, the Local Global Search may be an extension on the QLS approach that is capable of handling multiple windows at once. In the example shown in FIG. 9, the space 750 is divided such that the facilities are divided into k number of facilities in each of m windows 910a-910d. More particularly, in the example shown in FIG. 9, there are k=4 facilities in each of m=4 windows.

Using this designation, it is possible to use a QUBO formulation to solve the problem directly. More specifically, given the QUBO:

$$\min A \sum_{i=1}^{n}\left(\sum_{j=1}^{n} x_{ij} - 1\right)^2 + A \sum_{j=1}^{n}\left(\sum_{i=1}^{n} x_{ij} - 1\right)^2 + \sum_{i=1}^{n}\sum_{j=1}^{n}\sum_{\ell=1}^{n}\sum_{k=1}^{n} f_{ik} d_{j\ell} x_{ij} x_{k\ell}.$$

For a valid solution, $x_{ij}=1$ means facility I is assigned to a location j and 0 otherwise. A is a large positive number to penalize the violation of constraints, $f_{ij}$ is the flow between facility i and facility k, $d_{jl}$ is the distance between location j and location l.

| $x_i$ | Location 1 | Location 2 | Location 3 | Location 4 |
|---|---|---|---|---|
| Facility 1 | 0 | 1 | 0 | 0 |
| Facility 2 | 0 | 0 | 0 | 1 |
| Facility 3 | 1 | 0 | 0 | 0 |
| Facility 4 | 0 | 0 | 1 | 0 |

Given an initial assignment of the facilities $\{(i_l \to a_l)\}_{1 \le l \le n}$, first m disjoint subsets 1n of size k are selected. Then in each iteration of the local search, all local permutations inside each subset are allowed, and the assignment of the remaining facilities is fixed.

Hence, for each iteration:

$$W = \{W_l\}_{1 \le l \le m} = \{(i_1^l \to a_1^l, i_2^l a_2^l, \ldots, i_k^l \to a_k^l)\}_{1 \le l \le m}$$

Denotes the collection of m disjoint subsets, and the resulting QUBO to solve becomes:

$$\min A \sum_{i=1}^{n}\left(\sum_{j=1}^{n} x_{ij} - 1\right)^2 + A \sum_{j=1}^{n}\left(\sum_{i=1}^{n} x_{ij} - 1\right)^2 + \sum_{i=1}^{n}\sum_{j=1}^{n}\sum_{\ell=1}^{n}\sum_{k=1}^{n} f_{ik} d_{j\ell} x_{ij} x_{k\ell}.$$

where $x_{ij}=0$ for all $i \in w_l$, $j \notin w_l$ and $x_{ij}$ follows the initial assignment for all $i \in W$.

Figure 10:
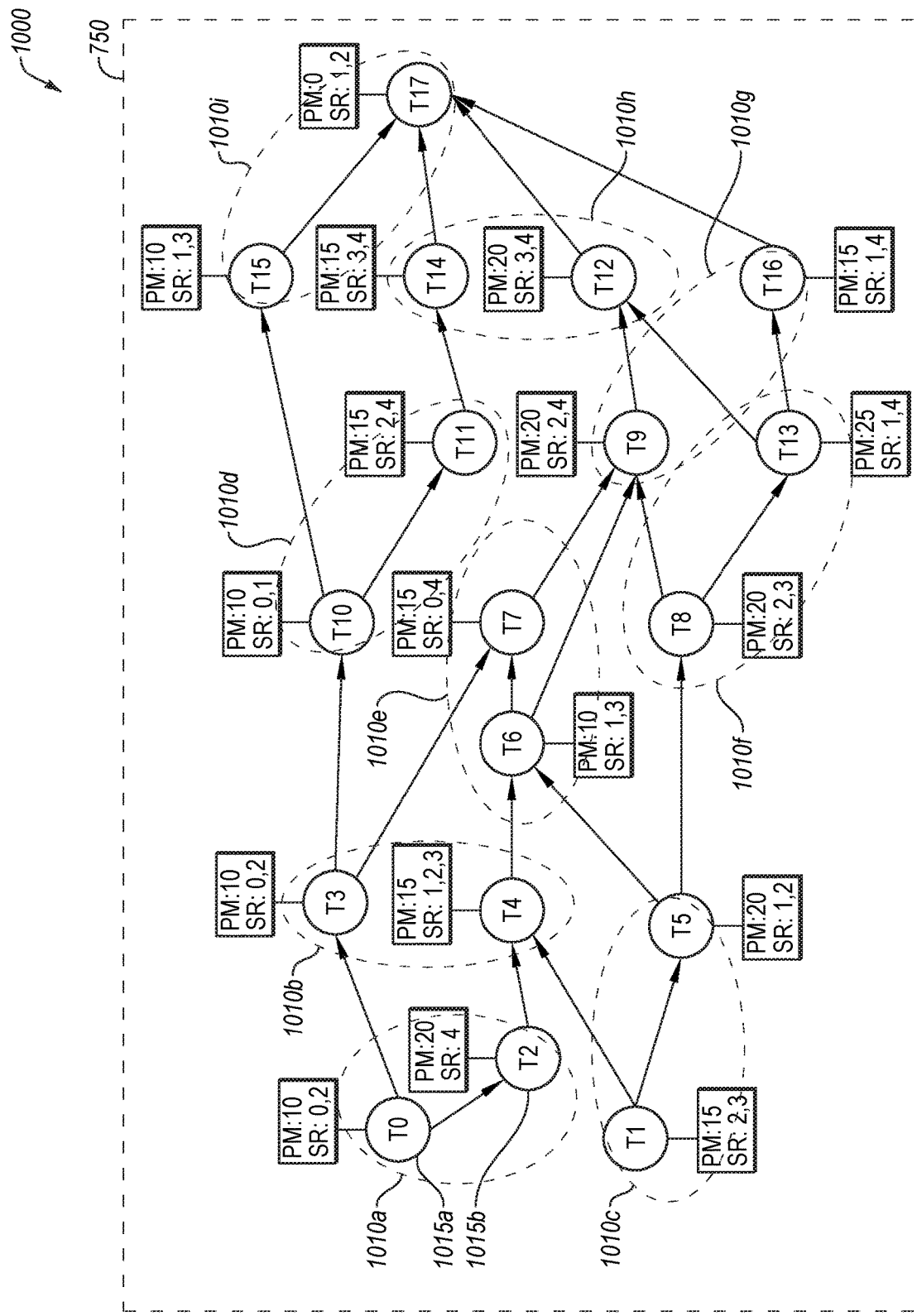
FIG. 10 is a diagram which illustrates a QAP problem illustrated as a series of nodes in a given space which is solved using a Local Global Search algorithm, in the special case where k=2.

FIG. 10 illustrates the special case when k=2, or when the facilities are divided into windows 1010a-1010g, each containing two facilities (e.g. 1015a and 1015b). In this instance, the QUBO to be solved is:

$$\min \sum_{\substack{(i \to a, j \to b) \\ (k \to c, \ell \to d) \in W}} [x_{ij}(1 - x_{k\ell})(f_{ik}d_{bc} + f_{i\ell}d_{bd} + f_{jk}d_{ac} + f_{j\ell}d_{ad}) +$$

$$(1 - x_{ij})x_{k\ell}(f_{ik}d_{ad} + f_{i\ell}d_{ac} + f_{jk}d_{bd} + f_{j\ell}d_{bc}) +$$

$$x_{ij}x_{k\ell}(f_{ik}d_{bd} + f_{i\ell}d_{bc} + f_{jk}d_{ad} + f_{j\ell}d_{ac}) +$$

$$(1 - x_{ij})(1 - x_{k\ell})(f_{ik}d_{ac} + f_{i\ell}d_{ad} + f_{jk}d_{bc} + f_{j\ell}d_{bd})] +$$

$$\sum_{\substack{(i \to a, j \to b) \\ (k \to c, \ell \to d) \notin W}} [x_{ij}(f_{ik}d_{bc}) + (1 - x_{ij})(f_{ik}d_{ac})]$$

In this instance, for a valid solution, $x_{ij}=1$ is used for the initial assignment (i→a, j→b), and 0 otherwise.

By way of comparing the Local Global Search method described herein versus the QLS methods currently used, it may be seen that the Local Global Search provides an exponentially larger search space, enables a "global" view of the problem, provides new possibilities beyond the optimization of only a local sub-space, is easier to solve since there are no constraints on the variables and utilizes the hardware more efficiently.

|  | QLS | Local Global Search, where k = 2 |
| --- | --- | --- |
| Search Space in One iteration | 32! = $2^{117.5}$ | $2^{1024}$ |
| QAP Number of facilities updated in one iteration | 32 | 2048 |

Figure 11:
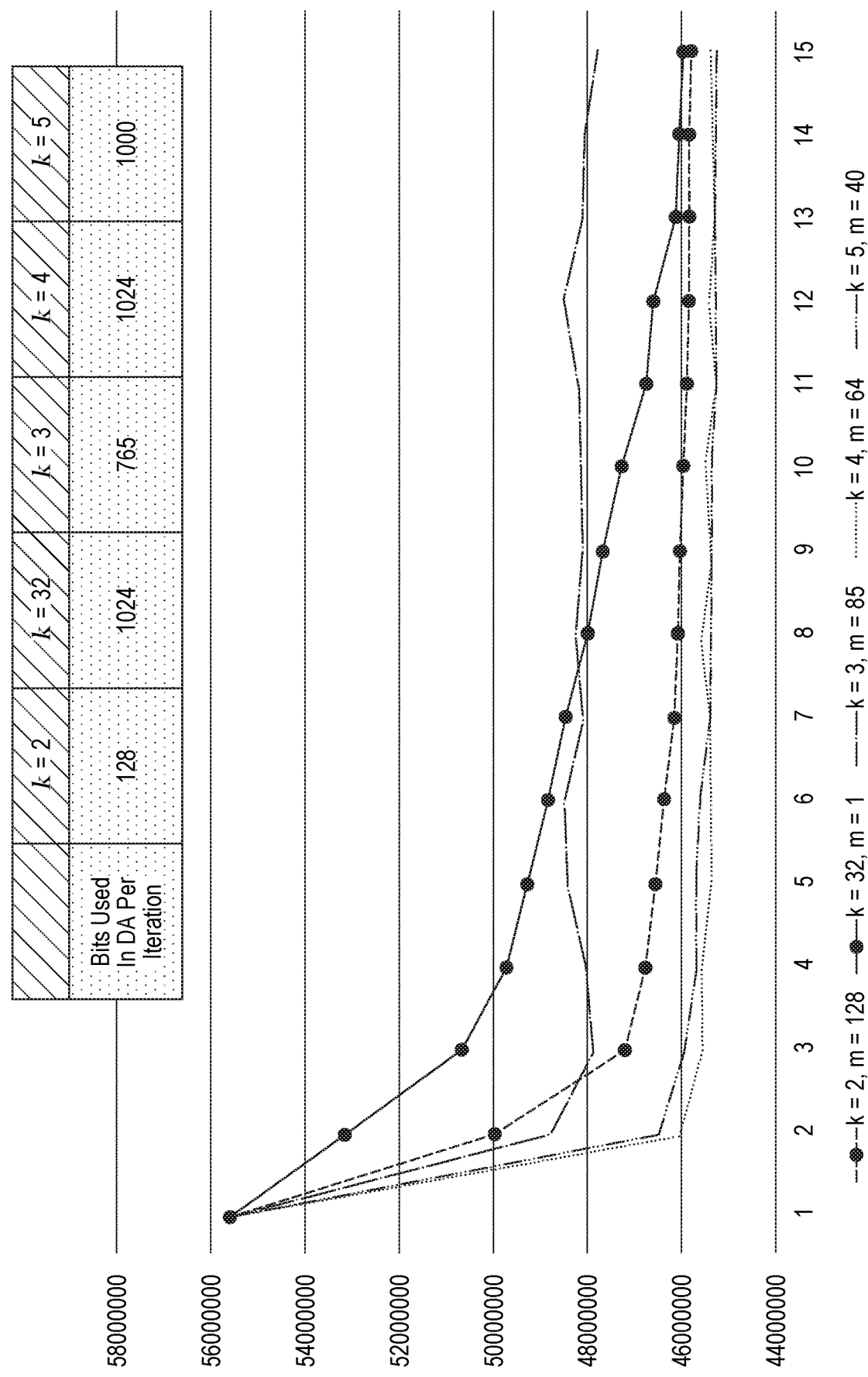
FIGS. 11-14 are graphs illustrating experimental results which were found using the method and system for solving a QAP problem using a Local Global Search.
Figure 12:
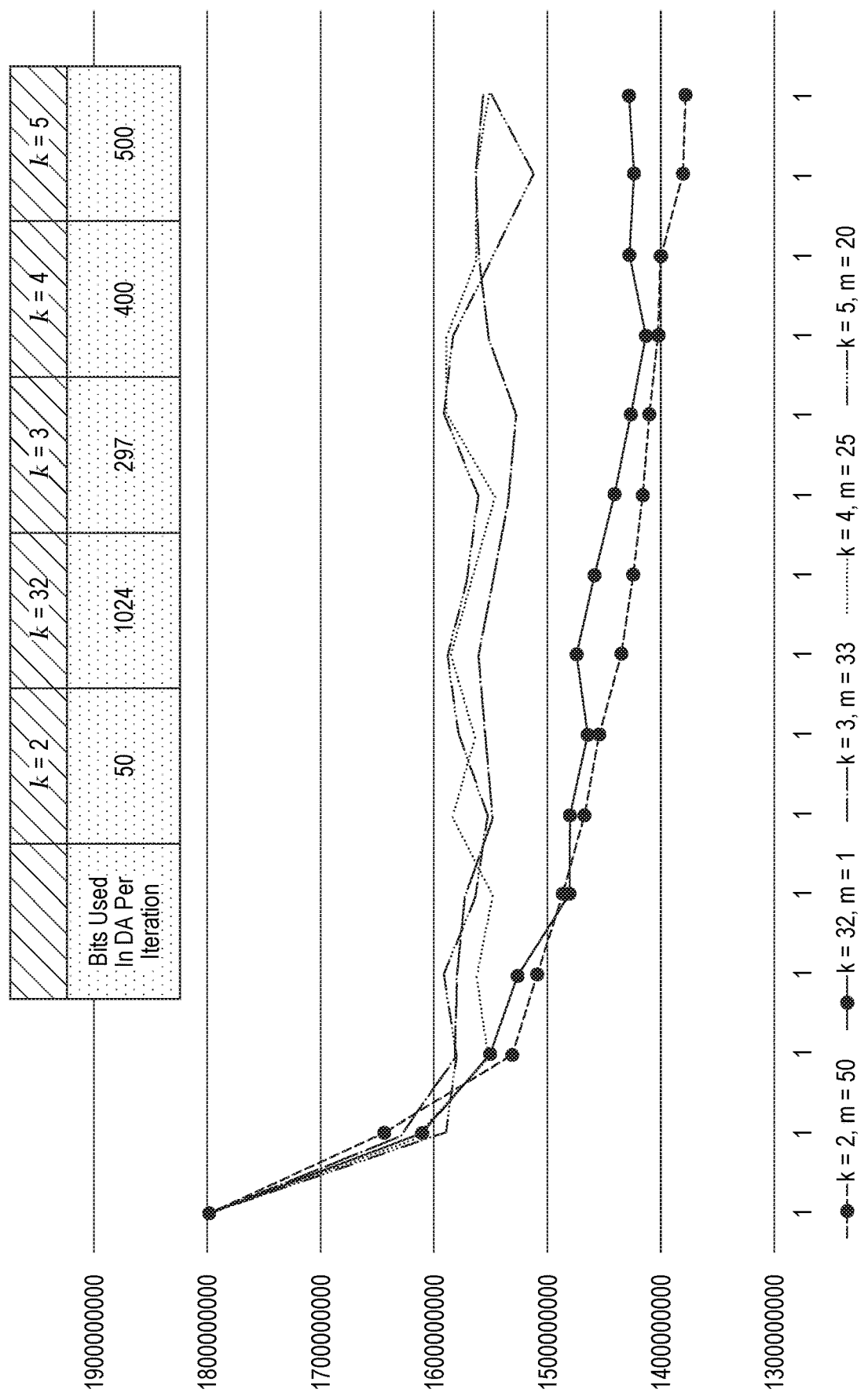
Figure 13:
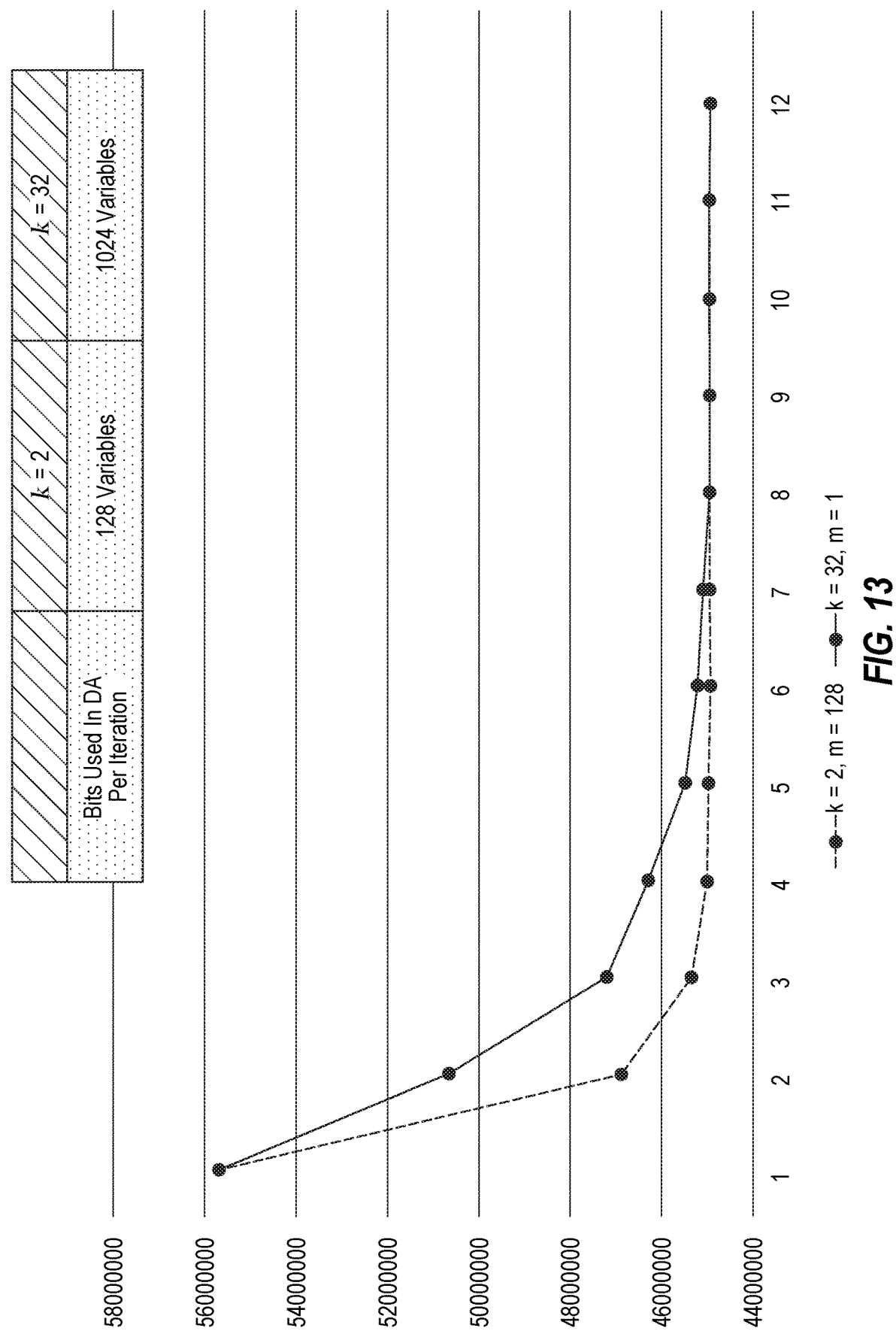
Figure 14:
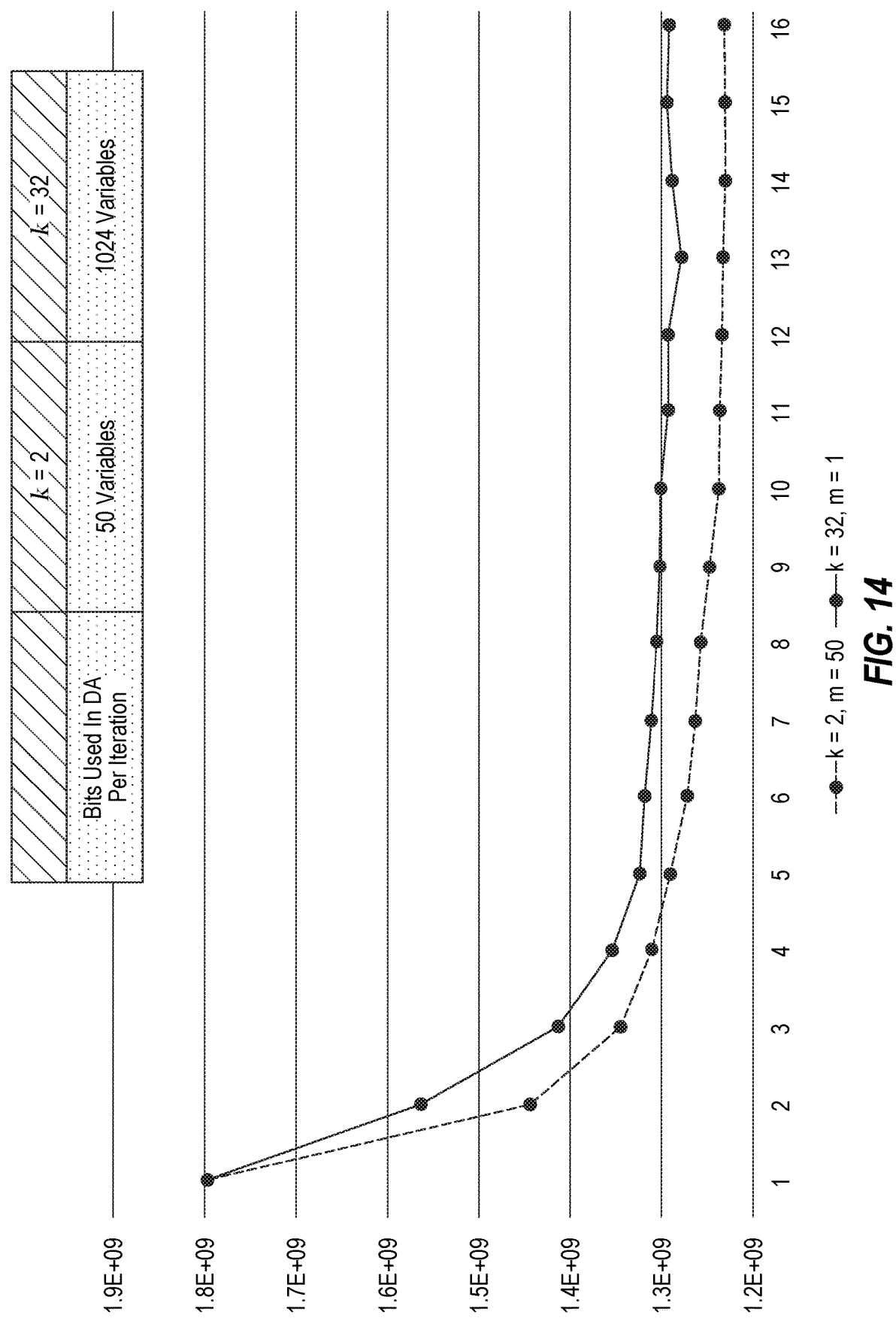

FIGS. 11-14 are graphs illustrating experimental results which were found using the method described herein. FIGS. 11 and 12 each illustrate the results which were found for different values of k and m, where the initial solution was random and the selecting of windows was random. FIGS. 13 and 14 each illustrate the results which were found for different values of k and m, where the initial solution was random and the selecting of windows was greedy. In the experiment performed in accordance with FIGS. 11-14, the penalization parameter was equal to:

$$A = \max_{i,j} f_{ij} \cdot \max_{k,l} d_{kl} \cdot 20.$$

As a result of the experiment, the ratio for obtaining a valid solution out of 14 problem instances was 100% when k=2, versus 64% for each of k=3, 4, 5, and 32.

According to the Local Global Search herein, m windows of k elements in each window w are used. It should be understood that the window size k corresponds to a measure of the search depth of locality, whereas the number of windows w corresponds to a measure of the spread of globality. The results illustrated in FIGS. 11-14 appear to indicate that smaller k values provide a better solution quality and convergence rate than larger k values because they utilize the QUBO solver hardware more effectively by choosing the largest possible m. It should be understood, however, that in some problem instances, choosing a larger k might provide better results. In such instances, the methods and systems described herein can be performed for a variety of different k and m values, depending on the unique demands of the problem being considered.

It should also be understood that as used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of solving a large scale combinatorial optimization problem, the method comprising:
   inputting, via at least one processor, an objective function and an initial solution of the large scale combinatorial optimization problem as a mapping from a plurality of n nodes to a set S;
   randomly clustering, via the at least one processor, the plurality of nodes into k clusters of n/k nodes each;

for each cluster of the k clusters, assigning binary variables to denote each possible permutation of a label set within the cluster;

determining, via the at least one processor that there are $u=k^2$ variables if $k>2$, and $u=1$ variables if $k=2$;

expressing the objective function in terms of the un/k variables;

solving the objective function in terms of the un/k variables using a Quadratic Unconstrained Binary Optimization (QUBO) solver to obtain an updated solution to the initial solution;

determining whether a convergence criterion is satisfied for the updated solution; and upon a determination that a convergence criterion is satisfied, outputting the updated solution to the objective function.

2. The method of claim 1, further comprising:

upon a determination that the convergence criterion is not satisfied, randomly clustering the plurality of nodes into a new set of random k clusters of n/k nodes each.

3. The method of claim 1, wherein the large scale combinatorial optimization problem comprises a Travelling Salesman Problem, a Quadratic Assignment Problem, a Linear Ordering Problem, a Linear Arrangement Problem, a K-way community detection problem, or a K-way graph partitioning problem.

4. The method of claim 1, wherein the large scale combinatorial optimization problem comprises job scheduling in an organization, vehicle routing for delivering cargo, learning causality from observed data, unsupervised learning of social network data, and deciding ranking from 2-way comparison data.

5. The method of claim 1, wherein the objective function in terms of the un/k variables corresponds to a QUBO problem, where any term in the objective function is either linear or quadratic:

$$\Sigma_{\{i,j\} \in [n] \times [n]} A_{ij} x_i x_j + \Sigma_{i=1}^n b_i x_i,$$

where $A_{ij}$ is a real constant and the solution is to minimize over $x_i$'s, where either $x_i \in \{0,1\}^n$, when viewed in Boolean space or $x_i \in \{-1, +1\}^n$, when viewed in Ising space, for all $i \in \{1, 2, \ldots, n\}$.

6. One or more non-transitory computer-readable storage media configured to store instructions that when executed by a system cause or direct the system to perform actions, the actions comprising:

inputting an objective function and an initial solution of a large scale combinatorial optimization problem as a mapping from a plurality of n nodes to a set S;

randomly clustering the plurality of nodes into k clusters of n/k nodes each;

for each cluster of the k clusters, assigning binary variables to denote each possible permutation of a label set within the cluster;

determining that there are $u=k^2$ variables if $k>2$, and $u=1$ variables if $k=2$;

expressing the objective function in terms of the un/k variables;

solving the objective function in terms of the un/k variables using a Quadratic Unconstrained Binary Optimization (QUBO) solver to obtain an updated solution to the initial solution;

determining whether a convergence criterion is satisfied for the updated solution; and upon a determination that a convergence criterion is satisfied, outputting the updated solution to the objective function.

7. The one or more non-transitory computer-readable storage media of claim 6, the actions further comprising:

upon a determination that the convergence criterion is not satisfied, randomly clustering the plurality of nodes into a new set of random k clusters of n/k nodes each.

8. The one or more non-transitory computer-readable storage media of claim 6, wherein the large scale combinatorial optimization problem comprises a Travelling Salesman Problem, a Quadratic Assignment Problem, a Linear Ordering Problem, a Linear Arrangement Problem, a K-way community detection problem, or a K-way graph partitioning problem.

9. The one or more non-transitory computer-readable storage media of claim 6, wherein the large scale combinatorial optimization problem comprises job scheduling in an organization, vehicle routing for delivering cargo, learning causality from observed data, unsupervised learning of social network data, and deciding ranking from 2-way comparison data.

10. The one or more non-transitory computer-readable storage media of claim 7, wherein the objective function in terms of the un/k variables corresponds to a QUBO problem, where any term in the objective function is either linear or quadratic:

$$\Sigma_{\{i,j\} \in [n] \times [n]} A_{ij} x_i x_j + \Sigma_{i=1}^n b_i x_i,$$

where $A_{ij}$ is a real constant and the solution is to minimize over $x_i$'s, where either $x_i \in \{0,1\}^n$, when viewed in Boolean space or $x_i \in \{-1, +1\}^n$, when viewed in Ising space, for all $i \in \{1, 2, \ldots, n\}$.

11. The one or more non-transitory computer-readable storage media of claim 6, wherein the one or more non-transitory computer-readable storage media is a part of a machine learning environment.

12. A system comprising:

one or more computer-readable storage media configured to store instructions; and one or more processors communicatively coupled to the one or more computer-readable storage media and configured to, in response to execution of the instructions, cause the system to perform operations, the operations comprising:

inputting an objective function and an initial solution of a large scale combinatorial optimization problem as a mapping from a plurality of n nodes to a set S;

randomly clustering the plurality of nodes into k clusters of n/k nodes each;

for each cluster of the k clusters, assigning binary variables to denote each possible permutation of a label set within the cluster;

determining that there are $u=k^2$ variables if $k>2$, and $u=1$ variables if $k=2$;

expressing the objective function in terms of the un/k variables;

solving the objective function in terms of the un/k variables using a Quadratic Unconstrained Binary Optimization (QUBO) solver to obtain an updated solution to the initial solution;

determining whether a convergence criterion is satisfied for the updated solution; and upon a determination that a convergence criterion is satisfied, outputting the updated solution to the objective function.

13. The system of claim 12, the operations further comprising:
upon a determination that the convergence criterion is not satisfied, randomly clustering the plurality of nodes into a new set of random k clusters of n/k nodes each.

14. The system of claim 12, wherein the large scale combinatorial optimization problem comprises a Travelling Salesman Problem, a Quadratic Assignment Problem, a Linear Ordering Problem, a Linear Arrangement Problem, a K-way community detection problem, or a K-way graph partitioning problem.

15. The system of claim 12, wherein the large scale combinatorial optimization problem comprises job scheduling in an organization, vehicle routing for delivering cargo, learning causality from observed data, unsupervised learning of social network data, and deciding ranking from 2-way comparison data.

16. The system of claim 12, wherein the objective function in terms of the un/k variables corresponds to a QUBO problem, where any term in the objective function is either linear or quadratic:

$$\Sigma_{\{i,j\} \in [n] \times [n]} A_{ij} x_i x_j + \Sigma_{i=1}^{n} b_i x_i,$$

where $A_{ij}$ is a real constant and the solution is to minimize over $x_i$'s, where either $x_i \in \{0,1\}^n$, when viewed in Boolean space or $x_i \in \{-1, +1\}^n$, when viewed in Ising space, for all $i \in \{1, 2, \ldots, n\}$.

17. The system of claim 12, wherein the system is a part of a machine learning environment.

\* \* \* \* \*